(Model.)

H. E. MOON.
Map Case.

No. 236,610. Patented Jan. 11, 1881.

Witnesses:
Mrs Mandy Stewart
Lizzie Stewart

Inventor:
Hiram E. Moon

UNITED STATES PATENT OFFICE.

HIRAM E. MOON, OF RICHMOND, INDIANA.

MAP-CASE.

SPECIFICATION forming part of Letters Patent No. 236,610, dated January 11, 1881.

Application filed August 7, 1880. (Model.)

*To all whom it may concern:*

Be it known that I, HIRAM E. MOON, a citizen of the United States, residing at Richmond, in the county of Wayne and State of Indiana, have invented a new and useful Map and Chart Case, of which the following is a specification.

My invention relates to map and chart cases in which one or more frames, boards, or leaves, with maps, charts, &c., pasted on their sides, are made to oscillate and fold by being hinged or pivoted to a common center.

The objects of my improvements are, first, to provide for maps, charts, blackboards, &c., a more durable back; second, to provide a series of maps, charts, &c., in a more convenient and condensed form than the usual way of mounting on rollers and hanging to the wall; third, to protect the maps, charts, &c., from dust and intruders; fourth, that the leaves or boards may be opened to any map or chart desired, or all may oscillate in map-frame from side to side, without any sliding motion of one leaf upon the other. I attain these objects by the mechanism illustrated in the accompanying drawings, in which—

Figure 1:
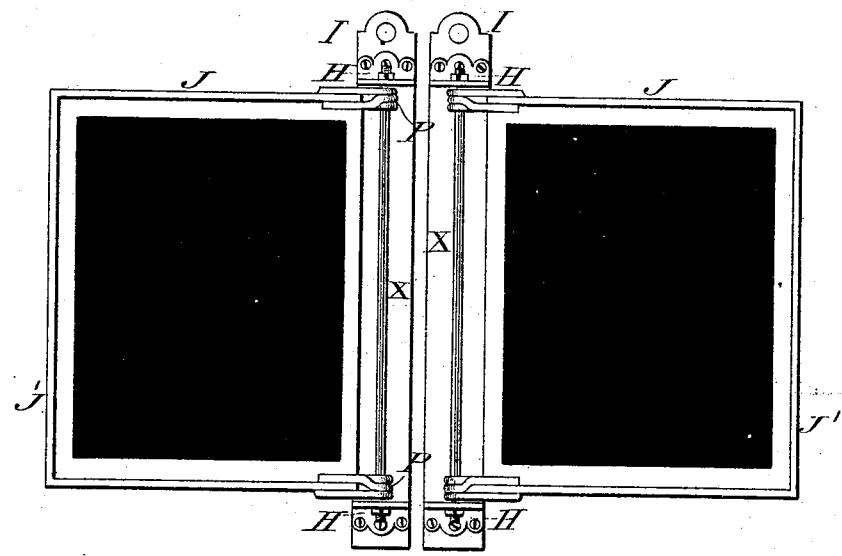
Figure 2:
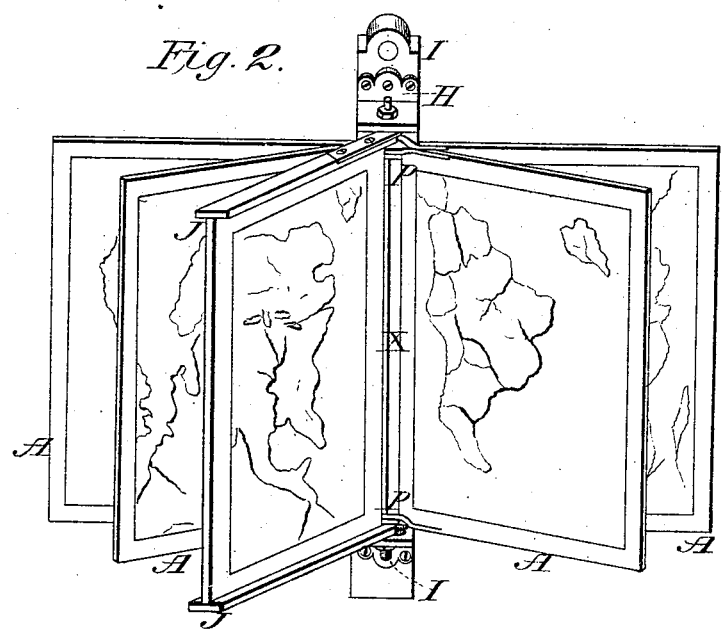

Figure 1 is a front elevation of the map-case turned to right and left against the wall to which it is attached, showing blackboards on either side. Fig. 2 is a front elevation of the same unfolded, showing a series of leaves vertically arranged, with maps upon their surface.

Similar letters refer to similar parts throughout the two views.

The strips or boards I I, to which the brackets H H are attached, Figs. 1 and 2, may be made of any desired material and of length sufficient to receive the upper and lower hinge-brackets, or they may be omitted, and the brackets H H may be attached to the wall or any part of a building desired, or it may be extended downward and terminate in a stand of its own. The brackets H H extend out from the wall or strip I sufficiently to permit the map-case to oscillate properly without the inner corner touching the wall or strip, and should project at least one-half the thickness of the case when folded.

The hinges P P, Figs. 1 and 2, for each leaf or board are made independent of the others, and so arranged that they turn smoothly, the one upon the other, on one center or rod, X X.

On any one of the oscillating leaves or boards, as at J J, Fig. 2, is placed permanently, at top and bottom, projecting boards or housings, under which all the leaves fold when closed, to prevent dust, &c.; or these housings may be placed in front as well as on top and bottom, as seen at J' J', Fig. 1. This housing should preferably divide in the center and be attached to the two outside leaves.

The method of operating this map and chart case is obvious, each leaf acting independent of the other, as does the leaf of a book, except that in the book-leaves each has a different center of motion, and in this map-case every leaf has the same center of motion. These leaves may be made of boards or frames, or may be made of paper or any other material suitable.

Having described my invention, what I claim therein as new, and desire to secure by Letters Patent, is—

1. The combination, with a series of leaves pivoted to one vertical center, of the housings J J, permanently attached to one or more of the leaves, and adapted to cover one or more of the other leaves, as and for the purposes specified.

2. A series of oscillating leaves, A A, with maps, charts, or slating on their surfaces, in combination with brackets H H, bracket-strip I, and housings J J, operating as specified.

HIRAM E. MOON.

Witnesses:
 ELI STUBBS,
 MARY ANNA STUBBS.